United States Patent [19]
Kishi

[11] Patent Number: 6,028,375
[45] Date of Patent: Feb. 22, 2000

[54] ENERGY CONVERTER

[76] Inventor: Harunori Kishi, 23-15, Shijimizuka 1-chome, Hamamatsu-shi, Shizuoka 432-8018, Japan

[21] Appl. No.: 09/331,875
[22] PCT Filed: Dec. 24, 1997
[86] PCT No.: PCT/JP97/04804
  § 371 Date: Jun. 28, 1999
  § 102(e) Date: Jun. 28, 1999
[87] PCT Pub. No.: WO98/29936
  PCT Pub. Date: Jul. 9, 1998

[30] Foreign Application Priority Data

Dec. 26, 1996 [JP] Japan ................................ 8-359888

[51] Int. Cl.$^7$ ....................................... G21D 7/02
[52] U.S. Cl. ............................................. 310/11; 310/308
[58] Field of Search ............................. 310/11, 10, 308;
  62/116; 60/518, 641.8; 322/2 R; 415/80, 81

[56] References Cited

U.S. PATENT DOCUMENTS

| | | | |
|---|---|---|---|
| 4,127,453 | 11/1978 | Radebold | 205/339 |
| 4,287,443 | 9/1981 | Aladiev et al. | 310/11 |
| 4,381,463 | 4/1983 | Branover | 310/11 |
| 4,395,648 | 7/1983 | Marks | 310/10 |
| 4,501,122 | 2/1985 | Cutler | 62/116 |
| 4,642,988 | 2/1987 | Benson | 60/641.14 |
| 4,645,959 | 2/1987 | Dobran | 310/11 |
| 4,785,209 | 11/1988 | Sainsbury | 310/11 |
| 4,906,977 | 3/1990 | Huey-Jeng | 340/626 |
| 5,239,833 | 8/1993 | Fineblum | 62/6 |

*Primary Examiner*—Thomas M. Dougherty
*Assistant Examiner*—Joseph Waks
*Attorney, Agent, or Firm*—Brian M. Mattison; Patents & TMS, P.C.

[57] ABSTRACT

An MHD generator system is provided to perform efficient MHD generation by efficiently converting heat enargy into kinetic energy of an electricity conducting liquid or liquid metal. Thermal flow flux is controlled by providing heat pipes having the functions of thermal switches between a high temperature heat source and an MHD generator, and between a low temperature heat source and the MHD generator, and by turning on and off the thermal switches, thereby causing the fluid in the MHD generator expand and contract. Electricity is generated by the movement of the electricity conducting liquid or liquid metal in the MHD gerator.

1 Claim, 2 Drawing Sheets

ENERGY CONVERTER

TECHNICAL FIELD

This invention relates to an MHD generator for converting heat energy into electric power.

BACKGROUND ART

As a device for converting heat energy from a heat source of several hundred degrees centigrade into electric power, the thermoelectric generator is conventionally known which utilizes the Seebeck effect. However, its output voltage is extremely low. With a differential temperature of 100° C., the output voltage is about 10 mV at the highest and has little practical meaning.

On the other hand, a proposal of MHD generation has been made in which a liquid metal having electric conductivity such as mercury is used as a working fluid. However, there has been no appropriate means for efficiently moving the electricity conducting liquid or liquid metal using the heat source.

The object of this invention is to provide an MHD generator capable of efficiently converting heat energy into kinetic energy of an electricity conducting liquid or liquid metal.

SUMMARY OF THE INVENTION

The subject of this invention is an MHD generator comprising;
- a mechanism for expanding a fluid in a tightly closed chamber by heating for a specified period of time by transmitting heat from a high temperature heat source through a heat pipe having a thermal switch function, and
- a mechanism for contracting the fluid in the tightly closed chamber by discharging heat for a specified period of time to a low temperature heat source through a heat pipe also having a thermal switch function, and
- causing the fluid to expand and contract by appropriately switching the thermal switches, causing an electricity conducting liquid or liquid metal sealed in the same chamber to move and generate electricity.

DETAILED DESCRIPTION OF THE PREFERRED EMBODIMENT

Figure 1:
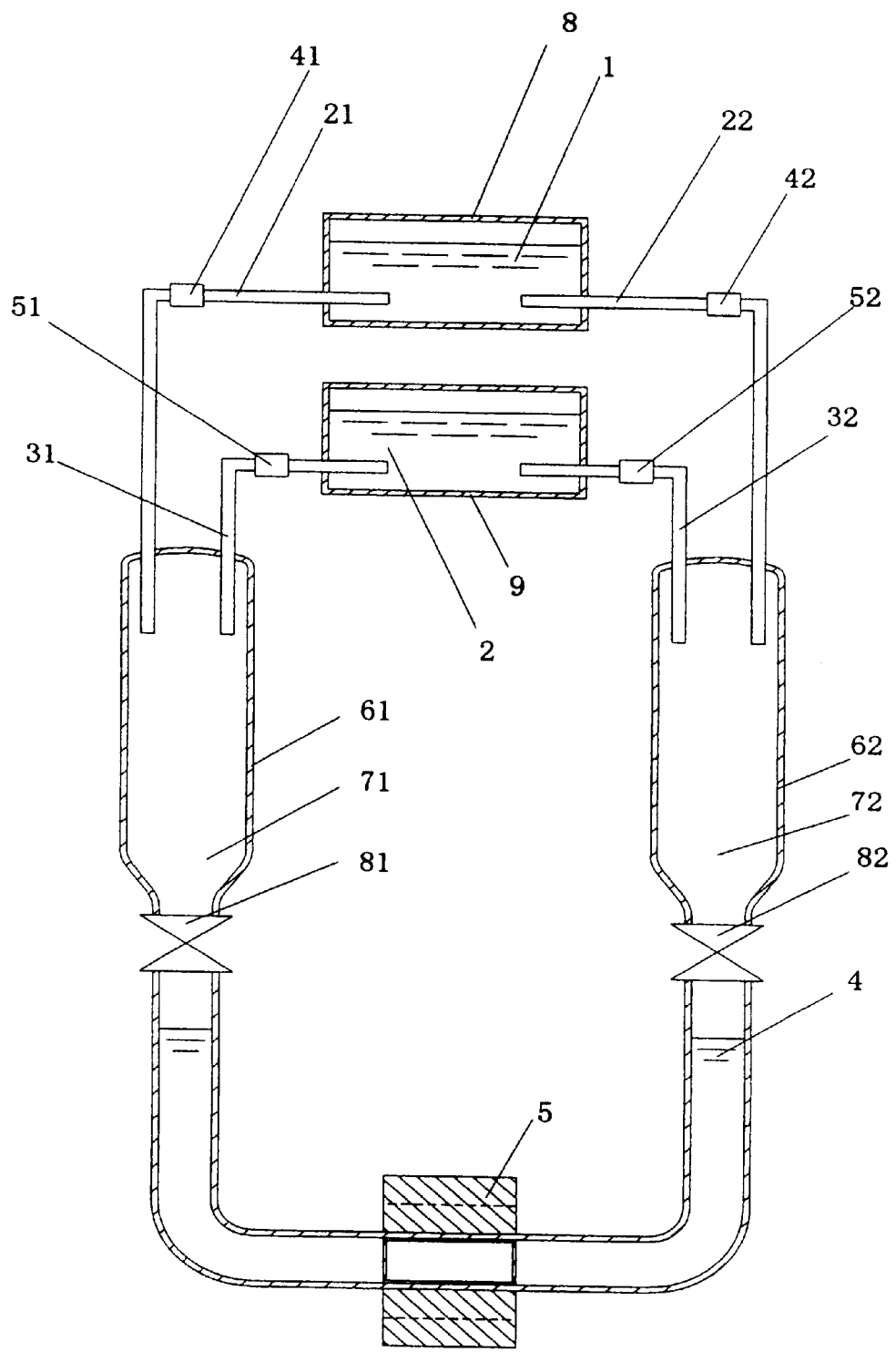
FIG. 1 is a front view in cross section of the device of the invention.
Figure 2:
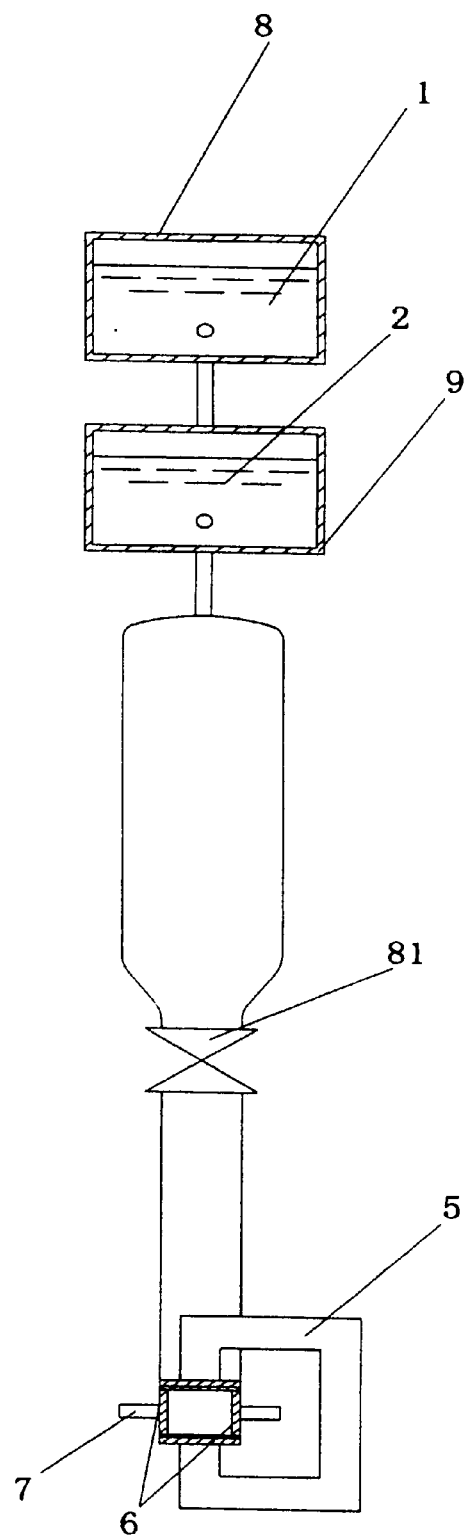
FIG. 2 is a side view of the device of the invention.

An embodiment of the invention will be hereinafter described in steps in reference to the appended drawings.

Step (a): Thermal switches 42 and 51 are turned off. At the same time, thermal switches 41 and 52 are turned on for a specified period of time.

Step (b): As a result, heat flows from a high temperature medium 1 through a heat pipe 21 to a fluid 71 in a tightly closed chamber 61, and the pressure of the fluid 71 increases. At the same time, heat flows from a fluid 72 in a tightly closed chamber 62 through a heat pipe 32 to a low temperature heat medium 2, and the pressure of the fluid 72 in the tightly closed chamber 62 decreases.

Step (c): Automatic valves 81 and 82 are opened.

Step (d): As a result, the expansion and contraction of the fluid occur so as to reduce difference in pressures, and an electricity conducting liquid 4 moves from left to right.

Step (e): As the electricity conducting liquid flows across a magnetic field produced with a magnet 5, a voltage is produced between terminals 7 through electrodes 6.

Step (f): The automatic valves 81 and 82 are closed with appropriate timing.

Step (g): In this step, opposite the step (a), the thermal switches 41 and 52 are turned off. At the same time, the thermal switches 42 and 51 are turned on.

Step (h): As a result, phenomena similar to those in the steps (b) through (e) occur in the reverse direction.

Step (i): Electricity is continuously produced by repeating the steps (a) through (g).

Incidentally, in the case sufficient expansion-contraction speeds of the fluid are obtained, the automatic valves 81 and 82 may be omitted. Alternatively, it is also possible to operate without providing the heat pipes 22 and 32 but providing a heat pipe having the functions of a high temperature switch and a low temperature switch.

With this invention, heat energy even from a heat source that is not at so high temperature may be converted to electric power of a relatively high voltage. Therefore, effective use of relatively low temperature heat energy such as the heat collected from cooling waste heat and solar heat energy becomes possible.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. An MHD generator for generating electricity, the generator comprising:
   - a flow passage for an electricity conducting liquid with both of its ends provided with tightly closed chambers with each of the tightly closed chambers being filled with a fluid;
   - a high temperature heat source connected to the tightly closed chambers through heat pipes having the functions of thermal switches;
   - a low temperature heat source connected to the tightly closed chambers through heat pipes also having the functions of thermal switches; and
   - an MHD generation mechanism constituted with a magnetic field generating device and electrodes disposed in the middle of the flow passage for the electricity conducting liquid and generating electricity by producing a differential pressure between the tightly closed chambers by opening and closing operations of the thermal switches and applying the produced pressure to the electricity conducting liquid to reciprocate the liquid in the flow passage.

* * * * *